(12) United States Patent
Keaton et al.

(10) Patent No.: US 9,518,145 B2
(45) Date of Patent: Dec. 13, 2016

(54) POLYURETHANES MADE USING ZINC CATALYSTS

(71) Applicants: Richard Keaton, Pearland, TX (US); Peter Margl, Midland, MI (US); Duane Romer, Midland, MI (US); Nathan Wilmot, Missouri City, TX (US); Rajat Duggal, Pearland, TX (US); Rashmi Chamsarkar, Thane (IN)

(72) Inventors: Richard Keaton, Pearland, TX (US); Peter Margl, Midland, MI (US); Duane Romer, Midland, MI (US); Nathan Wilmot, Missouri City, TX (US); Rajat Duggal, Pearland, TX (US); Rashmi Chamsarkar, Thane (IN)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/849,546

(22) Filed: Sep. 9, 2015

(65) Prior Publication Data

US 2015/0376326 A1 Dec. 31, 2015

Related U.S. Application Data

(62) Division of application No. 13/806,755, filed as application No. PCT/US2011/042920 on Jul. 5, 2011, now Pat. No. 9,156,935.

(60) Provisional application No. 61/362,560, filed on Jul. 8, 2010.

(51) Int. Cl.
| C08G 18/00 | (2006.01) |
| C08G 18/76 | (2006.01) |
| B01J 31/22 | (2006.01) |
| C08G 18/08 | (2006.01) |
| C08G 18/22 | (2006.01) |
| C08G 18/48 | (2006.01) |
| C08G 18/66 | (2006.01) |
| C08G 18/18 | (2006.01) |
| C08G 18/32 | (2006.01) |

(52) U.S. Cl.
CPC ........ *C08G 18/7671* (2013.01); *B01J 31/2243* (2013.01); *C08G 18/0885* (2013.01); *C08G 18/18* (2013.01); *C08G 18/222* (2013.01); *C08G 18/3206* (2013.01); *C08G 18/4841* (2013.01); *C08G 18/4883* (2013.01); *C08G 18/6674* (2013.01); *B01J 2231/14* (2013.01); *B01J 2531/26* (2013.01); *Y02P 20/52* (2015.11)

(58) Field of Classification Search
CPC .................................................. C08G 18/222
See application file for complete search history.

(56) References Cited

U.S. PATENT DOCUMENTS

| 3,631,146 A | 12/1971 | Briggs |
| 4,220,729 A * | 9/1980 | Uchida ................. C08J 9/0014 521/124 |
| 2006/0293486 A1 | 12/2006 | Emmrich |
| 2007/0027028 A1 | 2/2007 | Pears |

FOREIGN PATENT DOCUMENTS

| CN | 1835793 A | 9/2005 |
| EP | 102720 A | 3/1984 |
| GB | 937882 A | 9/1963 |

OTHER PUBLICATIONS

Khamma et al, "Thermally Stable Polyurethane-Ureas and Copolyurethane-Ureas containing zinc and nickel dihydroxysaltrien complexes", J. Appl. Polym. Sci. vol. 108, 245-255 (2008).

* cited by examiner

*Primary Examiner* — Michael L Leonard
(74) *Attorney, Agent, or Firm* — Gary C. Cohn

(57) ABSTRACT

Polyisocyanate-based polymers are formed by curing a reaction mixture containing at least one polyisocyanate and at least one isocyanate-reactive compound having at least two isocyanate-reactive groups in the presence of a zinc catalyst that contains at least one zinc atom associated with a polydentate ligand that contains at least one nitrogen-containing complexing site.

8 Claims, No Drawings

POLYURETHANES MADE USING ZINC CATALYSTS

This application claims priority from U.S. Provisional Application No. 61/362,560, filed 8 Jul. 2010.

This invention relates to processes for making polymers from polyisocyanates and isocyanate reactive materials. The invention is particularly applicable to making cast polyurethane elastomers.

Many solid or microcellular polyurethane elastomers are manufactured using cast elastomer methods. These elastomers are made by reacting a high equivalent weight polyol and a chain extender material with a polyisocyanate compound. Because it is usually intended to form a highly flexible, rubbery product, the amount of chain extender in the formulation is usually somewhat small. The elastomer is produced by mixing the starting materials and transferring the mixture into a mold where it is cured, usually with application of heat. Some or all of the high equivalent weight polyol may be pre-reacted with the polyisocyanate in a preliminary step to form an isocyanate-terminated prepolymer or quasi-prepolymer. Such a prepolymer is then caused to react with the chain extender and optionally a remaining portion of the high equivalent weight polyol during the molding step.

Open time is very important in cast elastomer processes. Once the starting materials are mixed, they must remain in an uncured, flowable state for several minutes to allow the mixture to be degassed (in most cases) and transferred into the mold. If the reaction proceeds too quickly, the mold may not fill completely, and/or flow lines or other defects appear in the parts, which can lead to high reject rates.

Once the mold is filled, however, a rapid cure is wanted, to reduce cycle times and maximize mold usage.

Organomercury compounds are often the catalysts of choice for cast elastomer processes. Organomercury catalysts offer an important combination of attributes, which are extremely difficult to duplicate with other catalyst systems. These organomercury catalysts provide a very desirable curing profile in which a long open time is followed by a rapid cure. A second attribute of organomercury catalysts is that they produce polyurethane elastomers that have very desirable physical and mechanical properties.

A third attribute of organomercury catalysts relates to the appearance of the finished polyurethane product. Organomercury catalysts tend to produce elastomers that have a highly uniform surface appearance. When many other catalyst systems are used in place of the organomercury catalysts, the resulting elastomers exhibit a surface appearance characterized by the presence of discrete transparent regions together with discrete opaque regions. Such an appearance is often cosmetically unacceptable to the consumer, again resulting in a high reject rate.

Mercury catalysts are undesirable from an environmental and worker exposure standpoint, and in many jurisdictions these are being phased out. Therefore, a replacement catalyst system is needed. Such a replacement catalyst system ideally would provide the attributes of organomercury catalysts, including a desirable cure profile, good property development in the product, and good surface appearance.

This invention is in one aspect a process for preparing a polyisocyanate-based polymer, comprising forming a reactive mixture containing at least one polyisocyanate, at least one isocyanate-reactive compound and at least one zinc catalyst, and then curing the reaction mixture to form a polymer, wherein the zinc catalyst contains at least one zinc atom associated with a polydentate organic ligand that contains at least two complexing sites, of which at least one is nitrogen-containing.

By "associates" it is meant that the zinc atom forms at least one bond to the ligand compound. Such a bond may be of any type, including, for example, an ionic bond, a covalent bond or a dative bond.

These zinc catalysts provide the desirable attributes of organomercury catalysts, including a long open time followed by a rapid cure, good physical properties and good surface appearance in the elastomer product.

The polydentate ligand contains at least two complexing sites that are spaced apart by at least one atom, and preferably by from 2 to 3 atoms. "Complexing sites" are sites that bond to the zinc ion. The complexing sites may, for example, form covalent, dative or ionic bonds to the zinc ion. At least one of the complexing sites contains nitrogen. A nitrogen-containing complexing site may be, for example, an amino, enamino or imino group.

The ligand may contain two or more nitrogen-containing complexing sites. Alternatively (or in addition), the ligand may contain one or more nitrogen-containing complexing sites and one or more complexing sites that do not contain nitrogen. A non-nitrogen-containing complexing site may be, for example, a sulfur-containing site such as thiol, sulfate or sulfonate, a phosphorus-containing site such as phosphine, phosphine oxide or phosphinimine, or an oxygen-containing site such as a hydroxyl group, ether or oxime, or a carbonyl-containing complexing site such as a keto, ester, carboxylate amide or urethane group.

Some particularly useful types of ligand compounds contain at least one hydroxyl or carbonyl group and at least one amino, enamino or imino group, wherein the amino, enamino or imino group is in the α- or β-position relative to the carbon to which the hydroxyl group is bonded, or to the carbonyl carbon, as the case may be. Ligands of these types include (A) α-amino alcohols; (B) α-imino alcohols, (C) β-amino alcohols or enols, (D) β-imino alcohols or enols, (E) β-enamino alcohols and (F) β-amino keto or β-enamino keto or ester compounds. Other particularly useful types of ligand compounds are (G) β-diketiminate compounds and (H) β-diamine compounds. Any of ligand types (A)-(H) may also contain additional complexing sites. When associated with the zinc ion in the catalyst, these ligands are typically in the corresponding anionic form, in which a hydrogen atom is extracted from a hydroxyl group (forming an alcoholate) and/or an amino group (forming an amide ion).

For purposes of this invention, an "α-amino alcohol" contains (1) a hydroxyl group and (2) an amino group that is bonded to a carbon atom that is alpha to the carbon atom to which the hydroxyl group is bonded. An α-imino alcohol contains (1) a hydroxyl group and (2) an imino group that is bonded to a carbon atom that is alpha to the carbon atom to which the hydroxyl group is bonded. Figures 1 and 1A represent structures of suitable α-amino alcohols and α-imino alcohols, respectively. The α carbons are indicated.

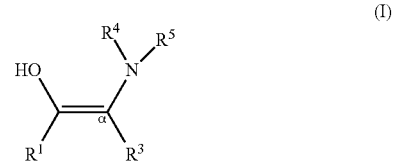

(I)

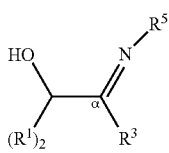

(IA)

In structures I, and IA, $R^5$ is a group that is bonded to the indicated nitrogen atom through a carbon, oxygen, nitrogen or silicon atom. Each $R^1$ and $R^3$ is independently hydrogen or a group that is bonded to the indicated carbon atom through a carbon, oxygen, nitrogen or silicon atom. An $R^1$ group and an $R^3$ group may together form a divalent group that is bonded to the indicated carbon atoms through carbon, oxygen, nitrogen and/or silicon atoms. $R^4$ is independently hydrogen or a group that is bonded to the indicated carbon atom through a carbon, oxygen, nitrogen or silicon atom. An $R^4$ group and an $R^5$ group may together form a divalent group that is bonded to the indicated nitrogen atom through carbon, oxygen, nitrogen and/or silicon atoms. An $R^3$ and an $R^5$ group may together form a divalent group that is bonded to the indicated carbon atom and the indicated nitrogen atom though carbon, oxygen, nitrogen and/or silicon atoms In some embodiments, the $R^1$, $R^3$, $R^4$ and $R^5$ groups contain no complexing sites, and no other groups which interfere with the ability of the ligand to associate with a zinc ion. In other embodiments, any or all of these groups contain one or more complexing sites, but no other groups that interfere with the ability of the ligand to associate with a zinc ion.

In some embodiments, the $R^5$ group(s) in structure I or IA is a hydrocarbyl group that may be unsubstituted or inertly substituted, or substituted with one or more complexing sites. As used herein, an "inert" substituent is a group that contains one or more atoms other than carbon or hydrogen ("heteroatoms"). An inert substituent is not a complexing site, and does not interfere with the ability of the ligand to associate with a zinc ion.

In other embodiments, one or more of the $R^5$ group(s) in structure I or IA is hydroxyl, an ether group, or a primary, secondary or tertiary amino group.

In structures I and IA, each $R^1$, $R^3$ and $R^4$ may independently be hydrogen or a hydrocarbyl group that may be unsubstituted, inertly substituted, or substituted with one or more complexing sites. In structures I and IA, an $R^1$ group and an $R^3$ group may together form a divalent hydrocarbyl group that is unsubstituted, inertly substituted or substituted with one or more complexing sites. In structures I and IA, an $R^4$ group and an $R^5$ group or an $R^3$ group and an $R^5$ group may together form a divalent hydrocarbyl group that may be unsubstituted or inertly substituted or substituted with one or more complexing sites.

For purposes of this invention, a "β-amino alcohol or enol" contains (1) an amino group and (2) an alcohol or enol group, in which the amino nitrogen is bonded to the carbon that is beta to the carbon to which the oxygen atom of the hydroxyl group is bonded. Structures II and IV represent structures of suitable β-amino alcohol and enol compounds.

For purposes of this invention, a "β-imino alcohol or enol" contains (1) an imino group and (2) an alcohol or enol group. The imino nitrogen is bonded to the carbon that is beta to the carbon to which the hydroxyl oxygen is bonded. Figures III and V represent structures of suitable β-imino alcohol or enol compounds.

For purposes of this invention, a "β-enamino alcohol" contains (1) an enamino group and (2) a hydroxyl group. In each case, the amino nitrogen is bonded to the carbon that is beta to which the hydroxyl group is bonded.

For purposes of this invention, a "β-amino or β-enamino keto or ester compound" contains (1) an amino or enamino group and (2) a keto or ester group. In each case, the amino nitrogen is bonded to the carbon that is beta to the carbonyl carbon of the keto or ester group. Structure VI represents some suitable β-enamino keto or ester compounds.

For purposes of this invention, a β-diketiminate compound contains either (1) two imino groups or (2) an amino and an imino group, in which the nitrogen atoms of the two groups are bonded to carbon atoms that are in the beta position with respect to each other. Suitable β-diketiminate compounds are represented by structures VII and VIII. For purposes of this invention, a β-diamine compound contains two amino groups in which the nitrogen atoms of the two groups are bonded to carbon atoms that are in the beta position with respect to each other. Suitable β-diamine compounds include those represented by structure IX.

In structures II-IX, the α- and β-carbon atoms are indicated.

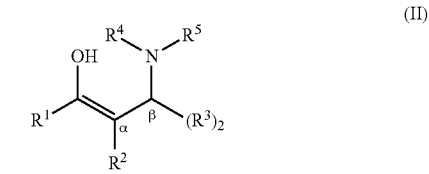

(II)

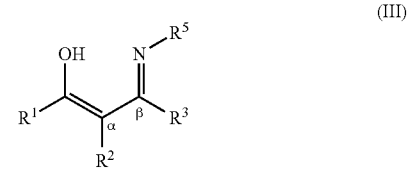

(III)

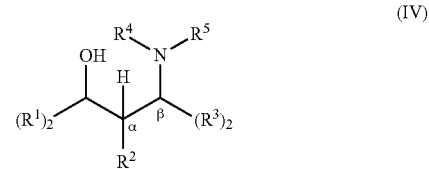

(IV)

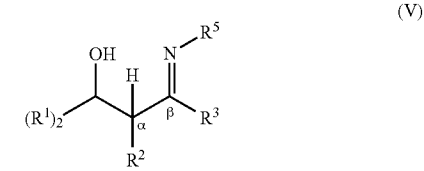

(V)

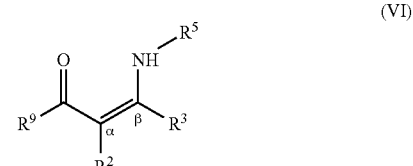

(VI)

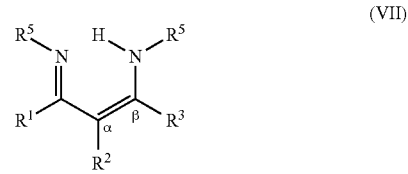

(VII)

-continued

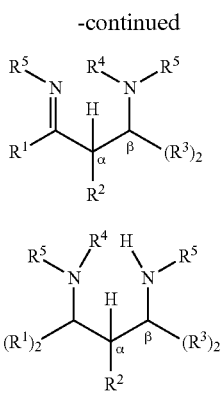

(VIII)

(IX)

In structures II-IX, $R^1$, $R^3$, $R^4$ and $R^5$ are as defined with respect to structures I and IA. Each $R^2$ is independently hydrogen or a group that is bonded to the indicated carbon atom through a carbon, oxygen, nitrogen or silicon atom. In any of structures II-IX, any two or more of $R^1$, $R^2$ and $R^3$ may together form a divalent or trivalent group that is bonded to the indicated carbon atoms through carbon, oxygen, nitrogen and/or silicon atoms. The divalent or trivalent group may be a hydrocarbyl group that is unsubstituted, inertly substituted and/or substituted with one or more complexing sites.

In structure VI, each $R^9$ is independently a hydrocarbyl group that may be unsubstituted, inertly substituted, or substituted with one or more complexing sites, $O^- M^+$ where M is a monovalent cation, or an —O—$R^{10}$ or —N($R^{10}$)$_2$ group, where each $R^{10}$ is independently hydrogen or a hydrocarbyl group that is unsubstituted, inertly substituted or substituted with one or more complexing sites. When $R^9$ is —O—$R^{10}$ and $R^{10}$ is a hydrocarbyl group, a compound of structure VI is an ester compound. An $R^9$ group may form a divalent or trivalent structure with an $R^2$ and/or $R^3$ group. Such a divalent or trivalent structure may be unsubstituted, inertly substituted or substituted with one or more complexing sites.

The $R^1$, $R^2$, $R^3$, $R^4$, $R^5$, $R^9$ and $R^{10}$ groups in some embodiments of the structure II-IX compounds contain no complexing sites, and no other groups which interfere with the ability of the ligand to associate with a zinc ion. In other embodiments of the structure II-IX compounds, any or all of these groups contain one or more complexing sites, but no other groups that interfere with the ability of the ligand to associate with a zinc ion.

The $R^5$ group(s) is in some embodiments of structure II-IX compounds a hydrocarbyl group that may be unsubstituted or inertly substituted, or substituted with one or more complexing sites. In structures II-IX, each $R^1$, $R^3$ and $R^4$ may independently be hydrogen or a hydrocarbyl group that may be unsubstituted, inertly substituted, or substituted with one or more complexing sites. In structures II-IX, any two or more of an $R^1$ group and $R^2$ group and an $R^3$ group may together form a divalent or trivalent hydrocarbyl group that is unsubstituted, inertly substituted or substituted with one or more complexing sites. As before, an $R^4$ group and an $R^5$ group or an $R^3$ group and an $R^5$ group in a structure II-IX compound may together form a divalent hydrocarbyl group that may be unsubstituted or inertly substituted or substituted with one or more complexing sites.

In other embodiments, one or more of the $R^5$ group(s) in any of structures II-IX are hydroxyl, an ether group, or a primary, secondary or tertiary amino group.

In structures I-V and VII-IX above, $R^1$ is in some embodiments a linear or branched alkyl group that has up to thirty carbon atoms, preferably up to twenty carbon atoms, and which may be substituted with one or more complexing sites or an inert substituent. In other embodiments, $R^1$ is an aromatic group such as a phenyl group, which may be substituted with alkyl, hydrocarbyl, one or more complexing sites and/or one or more inert substituents.

In structures I and IA, a divalent hydrocarbyl group formed by an $R^1$ group and an $R^3$ group may, together with the carbon atoms to which they are bonded, form an alicyclic ring structure or an aromatic ring structure, each of which may be unsubstituted, inertly substituted (such as with alkyl groups) and/or substituted with one or more complexing sites.

In structures II-V and VII-IX, a divalent or trivalent hydrocarbyl group formed from two or more $R^1$, $R^2$ and/or $R^3$ groups may, together with the carbon atoms to which they are attached, form an alicyclic ring structure or an aromatic ring structure, each of which may be unsubstituted, inertly substituted (such as with alkyl groups) and/or substituted with one or more complexing sites. In structures II-V and VII-IX, it is preferred that any such divalent hydrocarbyl group is formed by an $R^1$ group and an $R^2$ group.

In structure VI, a divalent or trivalent hydrocarbyl group formed from two or more $R^9$, $R^2$ and/or $R^3$ groups may form, together with the carbon atoms to which they are attached an alicyclic ring structure, an aromatic ring structure or a cyclic ester, each of which may be unsubstituted, inertly substituted (such as with alkyl groups) and/or substituted with one or more complexing sites. In structure VI, it is preferred that any such divalent hydrocarbyl group is formed by an $R^9$ group and an $R^2$ group.

If not forming a divalent or trivalent hydrocarbyl group with an $R^1$, $R^9$ or $R^3$ group, an $R^2$ group in structures II-IX is preferably a linear or branched alkyl group that has up to thirty, preferably up to twenty carbon atoms, and which may be substituted with one or more complexing sites or one or more inert substituents; a cycloalkyl group which may be substituted with one or more hydrocarbyl substituents, inert substituents and/or complexing sites; or an aromatic group such as a phenyl group, which may be substituted with alkyl or other hydrocarbyl substituents, one or more inert substituents and/or one or more complexing sites. The $R^2$ group in structures II-IX is more preferably hydrogen.

In any of structures I-IX, each $R^3$, if not part of a divalent or trivalent hydrocarbyl group with an $R^1$, $R^9$, $R^5$ and/or $R^2$ group, is preferably hydrogen; a linear or branched alkyl group that has up to thirty, preferably up to twenty carbon atoms, and which may be substituted with one or more complexing sites or one or more inert substituents; a cycloalkyl group which may be substituted with one or more hydrocarbyl substituents, inert substituents and/or complexing sites; or an aromatic group such as a phenyl group, which may be substituted with alkyl or other hydrocarbyl substituents, one or more inert substituents and/or one or more complexing sites.

An $R^9$ group, when not part of a divalent or trivalent structure with an $R^2$ and/or $R^3$ group, may be in some embodiments, a linear or branched alkyl group that has up to thirty carbon atoms, preferably up to twenty carbon atoms, and which may be substituted with one or more complexing sites or an inert substituent. In other embodiments, $R^9$ is an aromatic group such as a phenyl group, which may be substituted with alkyl, hydrocarbyl, one or more complexing sites or an inert substituent. In still other embodiments, the $R^9$ group is an —O—$R^{11}$ group, in which the RH group is a linear or branched alkyl group that has up to thirty carbon atoms, preferably up to twenty carbon atoms, and which may be substituted with one or more complexing sites or an inert substituent or an aromatic group such as a phenyl group, which may be substituted with alkyl, hydrocarbyl, one or more Z groups and/or one or more inert substituents, or may be hydrogen.

If not part of a divalent structure that includes the $R^5$ group, each $R^4$ in structures I, II, IV, VIII and IX is preferably hydrogen; a linear or branched alkyl group having up to 30, preferably up to 20 carbon atoms, which may be inertly substituted; an aromatic group such as a phenyl group, which may be substituted with one or more inert substituents and/or one or more complexing sites; or a $-(CH_2)_n-Z$ group, wherein Z is a complexing site as described before and n is from 1 to 6, preferably 2 or 3 and more preferably 2.

If not part of a divalent structure that includes an $R^3$ or $R^4$ group, each $R^5$ in structures I-IX is preferably a linear or branched alkyl group having up to 30, preferably up to 20 carbon atoms, which may be inertly substituted; an aromatic group such as a phenyl group, which may be substituted with one or more inert substituents and/or one or more complexing sites; or a $-(CH_2)_n-Z$ group, wherein Z and n are as described before.

When $R^4$ and $R^5$ form a divalent group, the divalent group may, together with the amine nitrogen atom to which they are attached, form an alicyclic ring structure or an aromatic ring structure, each of which may be unsubstituted, inertly substituted (such as with alkyl groups) and/or substituted with one or more complexing sites. In some embodiments, $R^4$ and $R^5$ together form an

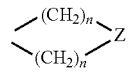

group, where n and Z are as defined before.

Z groups are preferably $>N(R^6)$, $-NHR_6$ or $-N(R^6)_2$, wherein each $R^6$ is independently a hydrocarbyl group that is unsubstituted, inertly substituted or substituted with one or more complexing sites and further wherein two $R^6$ groups can form a divalent structure. $R^6$ is in some embodiments an aromatic group such as phenyl, an alkyl group having up to 30 carbon atoms, preferably up to twenty carbon atoms, including, for example, methyl, or a $-(CH_2)_n-Z$ group, wherein Z is as described before and n is from 1 to 6, preferably 2 or 3 and more preferably 2.

Many ligand compounds as described above exist as two or more tautomeric forms, which are typically in equilibrium with each other. Mixtures of these tautomeric forms are useful ligands.

The ligand compound in some embodiments contains exactly 2, 3 or 4 complexing sites, although it is possible that the ligand contains a greater number of complexing sites.

Some examples of specific ligand compounds include those having the structures X-XXXV as follow:

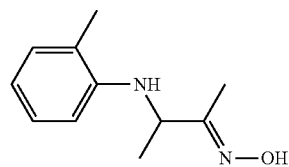
(X)

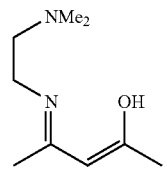
(XI)

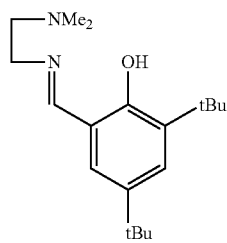
(XII)

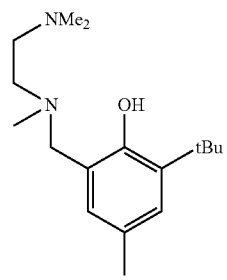
(XIII)

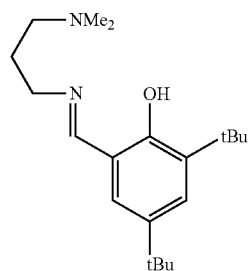
(XIV)

(XV)
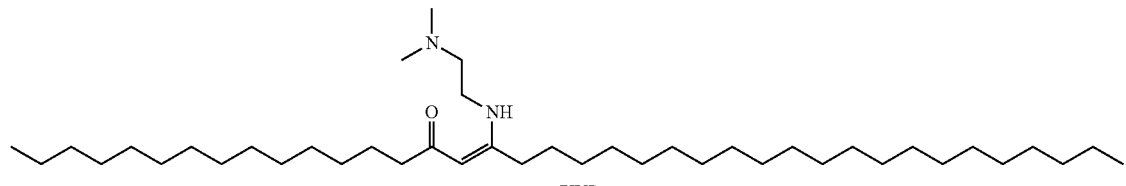
(XVI)
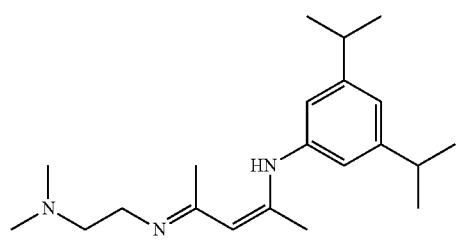
(XVII)
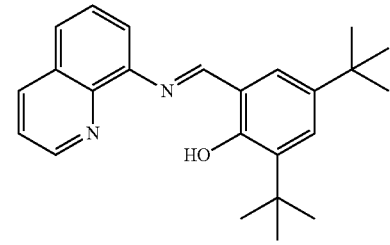
(XVIII)
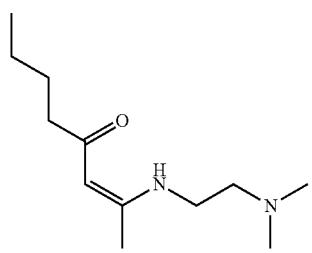
(XIX)
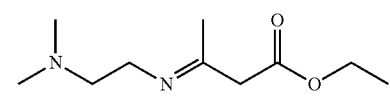
(XX)
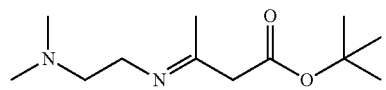
(XXI)
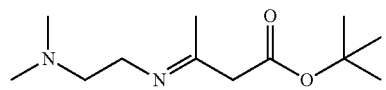
(XXII)
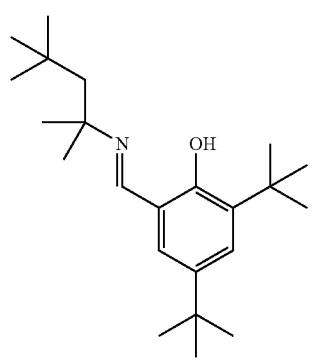
(XXIII)
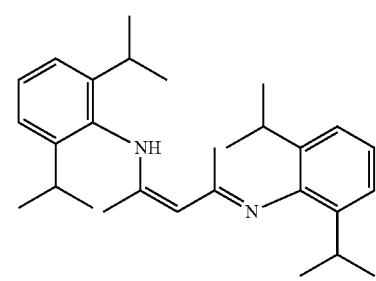
(XXIV)
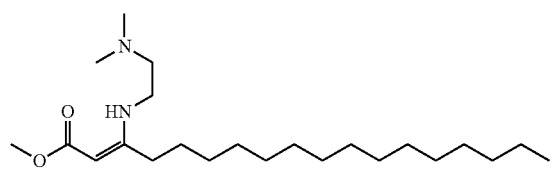
(XXV)
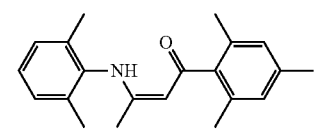

-continued
(XXVI)
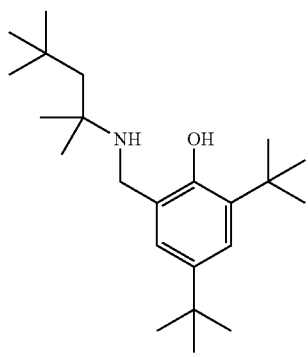
(XXVII)
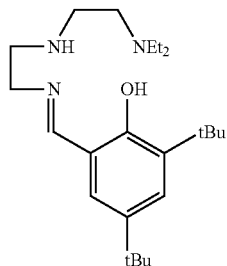
(XXVIII)
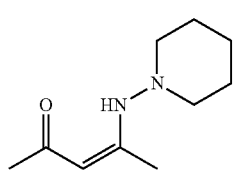
(XXIX)
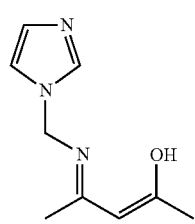
(XXX)
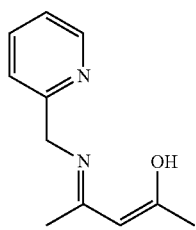
(XXXI)
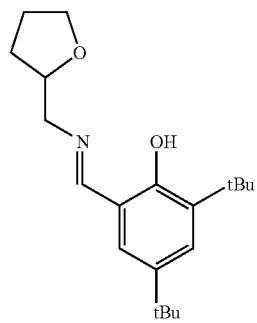
(XXXII)
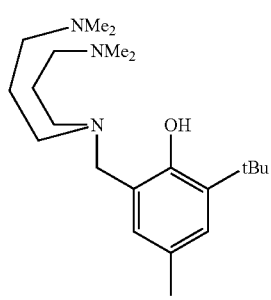
(XXXIII)
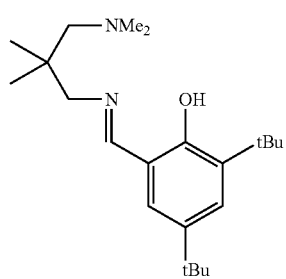
(XXXIV)
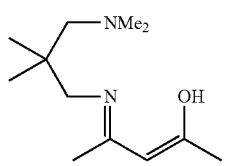
(XXXV)
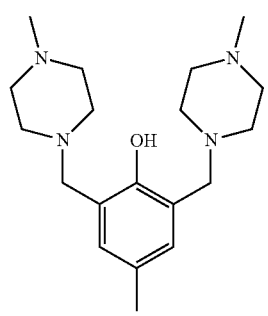

The zinc atom may be associated with one or two molecules of the ligand compound. Hydroxyl groups on the ligand compound will typically be in the alcoholate form when the ligand becomes associated with the zinc. Carbonyl groups often complex with the zinc in the tautomeric enol form. Additional ligands/anions may be associated with the zinc atom to balance the charge. An additional anion may be, for example, a carboxylate, especially acetate, halogen, or other monovalent anion.

The zinc catalysts are easily prepared by reaction of a zinc compound such as diethyl zinc or $Zn[N(SiMe_3)_2]_2$ with one or more of the aforementioned ligands. Typically, from about 1 to about 3 moles of the ligand are provided per mole of the zinc salt. The reaction is conveniently performed in a solvent such as acetone, 1,4-dioxane, benzene, toluene, tetrahydrofuran or any other organic solvent that does not participate in the reaction. The reaction can be performed at room temperature or a somewhat elevated temperature of up to about 70° C. After the reaction is completed, the solvent may be removed if desired and the catalyst isolated and dried.

A polymer is prepared in accordance with the invention by forming a mixture of at least one organic polyisocyanate compound, at least one isocyanate-reactive material that reacts at least difunctionally with isocyanate groups, and a catalytically effective amount of the zinc catalyst, and curing the mixture to form the polymer. Curing is achieved by subjecting the mixture to conditions sufficient for the organic polyisocyanate compound and the isocyanate reactive material to react to form the polymer. The polymer will in most cases contain urethane linkages, urea linkages, allophonate linkages, biuret linkages, isocyanurate linkages, amide linkages, oxazolidone linkages, or some of each type of linkage.

The organic polyisocyanate contains an average of at least 1.5 and preferably at least 2.0 isocyanate groups per molecule. It may contain as many as 8 isocyanate groups per molecule, but typically contains no more than about 4 isocyanate groups per molecule. The organic polyisocyanate may contain as little as 0.5% by weight isocyanate groups, or may contain as much as about 50% by weight isocyanate groups. The isocyanate groups may be bonded to aromatic, aliphatic or cycloaliphatic carbon atoms. Examples of polyisocyanates include m-phenylene diisocyanate, tolulene-2,4-diisocyanate, tolulene-2,6-diisocyanate, hexamethylene-1,6-diisocyanate, tetramethylene-1,4-diisocyanate, cyclohexane-1,4-diisocyanate, hexahydrotoluene diisocyanate, naphthylene-1,5-diisocyanate, methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"-triphenyl methane triisocyanate, a polymethylene polyphenylisocyanate (PMDI), toluene-2,4,6-triisocyanate and 4,4'-dimethyldiphenylmethane-2,2',5,5'-tetraisocyanate. Preferably the polyisocyanate is diphenylmethane-4,4'-diisocyanate, diphenylmethane-2,4'-diisocyanate, PMDI, toluene-2,4-diisocyanate, toluene-2,6-diisocyanate or mixtures thereof. Diphenylmethane-4,4'-diisocyanate, diphenylmethane-2,4'-diisocyanate and mixtures thereof are generically referred to as MDI, and all can be used. Toluene-2,4-diisocyanate, toluene-2,6-diisocyanate and mixtures thereof are generically referred to as TDI, and all can be used.

Any of the foregoing isocyanates can be modified to include urethane, urea, biuret, carbodiimide, allophonate, uretonimine, isocyanurate, amide or like linkages. Examples of modified isocyanates of these types include various urethane group and/or urea group-containing prepolymers, some of which are described in more detail below, and so-called "liquid MDI" products, and the like.

A wide range of isocyanate-reactive materials can be used to form the polymer through reaction with the organic polyisocyanate. A suitable isocyanate-reactive material contains at least two hydrogen atoms that are active according to the well-known Zerewitinoff active hydrogen determination test. Isocyanate-reactive groups that contain active hydrogen atoms include aliphatic primary or secondary hydroxyl groups, aromatic hydroxyl groups, aliphatic or aromatic primary or secondary amine groups, thiol (mercapto) groups, carboxylic acid groups, oxirane groups and the like. An isocyanate-reactive material should contain at least two of such isocyanate-reactive groups. The isocyanate-reactive groups on a particular isocyanate-reactive material may be all the same, or may be of two or more different types.

Various types of isocyanate-reactive materials can be used. One of these is water, which is considered to be an isocyanate-reactive material for purposes of this invention as it consumes two polyisocyanate molecules to produce a urea linkage, with elimination of a molecule of carbon dioxide.

Another type of isocyanate-reactive material is a high equivalent weight isocyanate-reactive material that has a molecular weight of at least 250 per isocyanate-reactive group. These high equivalent weight isocyanate-reactive materials are commonly used in making flexible and semi-flexible polyurethane and/or polyurea polymers, which may be non-cellular, microcellular or foam materials. These high equivalent weight materials are also used as flexibilizers or tougheners for rigid foamed and non-foamed polyurethane and/or polyurea polymers.

Various types of high equivalent weight isocyanate-reactive materials are useful, including hydroxyl-functional acrylate polymers and copolymers, hydroxyl-functional polybutadiene polymers, polyether polyols, polyester polyols, amine-terminated polyethers, and various polyols that are based on vegetable oils or animal fats. Polyether polyols include, for example, polymers of propylene oxide, ethylene oxide, 1,2-butylene oxide, tetramethylene oxide, block and/or random copolymers thereof, and the like. Of particular interest for many high-volume applications are poly(propylene oxide) homopolymers, random copolymers of propylene oxide and ethylene oxide in which the oxyethylene content is, for example, from about 1 to about 30% by weight, ethylene oxide-capped poly(propylene oxide) polymers which contain from 70 to 100% primary hydroxyl groups, and ethylene oxide-capped random copolymers of propylene oxide and ethylene oxide in which the oxyethylene content is from about 1 to about 30% by weight. The polyether polyols may contain low terminal unsaturation (for example, less than 0.02 meq/g or less than 0.01 meq/g), such as those made using so-called double metal cyanide (DMC) catalysts, as described for example in U.S. Pat. Nos. 3,278,457, 3,278,458, 3,278,459, 3,404,109, 3,427,256, 3,427,334, 3,427,335, 5,470,813 and 5,627,120. Polymer polyols of various sorts may be used as well. Polymer polyols include dispersions of polymer particles, such as polyurea, polyurethane-urea, polystyrene, polyacrylonitrile and polystyrene-co-acrylonitrile polymer particles, in a polyol, typically a polyether polyol. Suitable polymer polyols are described in U.S. Pat. Nos. 4,581,418 and 4,574,137.

High equivalent weight isocyanate-reactive polyesters include reaction products of polyols, preferably diols, with polycarboxylic acids or their anhydrides, preferably dicarboxylic acids or dicarboxylic acid anhydrides. The polycarboxylic acids or anhydrides may be aliphatic, cycloaliphatic, aromatic and/or heterocyclic and may be substituted, such as with halogen atoms. The polycarboxylic acids may be unsaturated. Examples of these polycarboxylic acids include succinic acid, adipic acid, terephthalic acid, isophthalic acid, trimellitic anhydride, phthalic anhydride, maleic acid, maleic acid anhydride and fumaric acid. The polyols used in making the polyester polyols preferably have an equivalent weight of 150 or less and include ethylene glycol, 1,2- and 1,3-propylene glycol, 1,4- and 2,3-butane diol, 1,6-hexane diol, 1,8-octane diol, neopentyl glycol, cyclohexane dimethanol, 2-methyl-1,3-propane diol, glycerine, trimethylol propane, 1,2,6-hexane triol, 1,2,4-butane triol, trimethylolethane, pentaerythritol, quinitol, mannitol, sorbitol, methyl glycoside, diethylene glycol, triethylene glycol, tetraethylene glycol, dipropylene glycol, dibutylene glycol and the like. Polycaprolactone polyols are useful. Polymer polyols of various sorts may be used as well.

High equivalent weight amine-terminated polyethers include polymers and copolymers of propylene oxide, in which all or a portion of the terminal hydroxyl groups are converted to amino groups. The conversion to amino groups can be performed in a reductive amination process in which the polyether is reacted with hydrogen and ammonia or a primary amine. Amine-terminated polyethers of this type are commercially available from Huntsman under the trade name Jeffamine®. Another type of amine-terminated polyether is prepared by capping the terminal hydroxyl groups of a polyether with a diisocyanate to produce an isocyanate-terminated intermediate, and then hydrolyzing the isocyanate-terminal groups to form terminal aromatic amine groups.

High equivalent weight isocyanate-reactive materials based on vegetable oils and/or animal fats include, for example, castor oil, hydroxymethyl group-containing polyols as described in WO 2004/096882 and WO 2004/096883, amide group-containing polyols as described in WO 2007/019063, hydroxyl ester-substituted fatty acid esters as described in WO 2007/019051, "blown" soybean oils as described in US Published Patent Applications 2002/0121328, 2002/0119321 and 2002/0090488, oligomerized vegetable oil or animal fat as described in WO 06/116456, hydroxyl-containing cellulose-lignin materials, hydroxyl-containing modified starches as well as the various types of renewable-resource polyols described in Ionescu, *Chemistry and Technology of Polyols for Polyurethanes*, Rapra Publishers 2005.

Another useful class of isocyanate reactive materials is a polyol or aminoalcohol that contains at least three isocyanate-reactive groups per molecule and has a molecular weight per isocyanate-reactive group of up to 249, preferably from about 30 to about 200. These materials may have up to 8 or more isocyanate-reactive groups per molecule. They most typically include no more than one primary or secondary amino group, and two or more primary or secondary hydroxyl groups. This class of isocyanate-reactive materials includes materials that are commonly known as crosslinkers or, because they are commonly used in making rigid polyurethane foams, "rigid polyols". Examples of isocyanate-reactive materials of this type include diethanolamine, triethanolamine, di- or tri(isopropanol)amine, glycerine, trimethylol propane, pentaerythritol, various polyester polyols that have at least three hydroxyl groups per molecule and an equivalent weight of up to 249, and various low equivalent weight polyether polyols that have at least three hydroxyl groups per molecule. The low equivalent weight polyether polyols include, for example, ethoxylates and/or propoxylates of an aromatic diamine such as toluene diamine and phenylene diamine, an aliphatic diamine such as ethylene diamine, cyclohexanedimethanol and the like, or a polyol having at least three hydroxyl groups, such as, for example, glycerine, sucrose, sorbitol, pentaerythritol, trimethylolpropane, trimethylolethane and the like.

Another class of suitable isocyanate-reactive materials includes chain extenders, which for the purposes of this invention means a material having exactly two isocyanate-reactive groups per molecule and an equivalent weight per isocyanate-reactive group of up to 249, especially from 31 to 125. The isocyanate reactive groups are preferably hydroxyl, primary aliphatic or aromatic amine or secondary aliphatic or aromatic amine groups. Representative chain extenders include ethylene glycol, diethylene glycol, triethylene glycol, 1,2-propylene glycol, 1,3-propylene glycol, 1,4-butane diol, 1,6-hexane diol, neopentyl glycol, dipropylene glycol, tripropylene glycol, poly(propylene oxide) diols of up to 249 equivalent weight, cyclohexanedimethanol, poly(ethylene oxide)diols of up to 249 equivalent weight, aminated poly(propylene oxide)diols of up to 249 equivalent weight, ethylene diamine, phenylene diamine, diphenylmethane diamine, bis(3-chloro-4-aminophenyl) methane and 2,4-diamino-3,5-diethyl toluene. A mixture of chain extenders may be used.

The relative amounts of polyisocyanate and isocyanate-reactive materials are selected to produce a high molecular weight polymer. The ratio of these components is typically expressed as "isocyanate index" which for purposes of this invention means 100 times the ratio of isocyanate groups to isocyanate-reactive groups provided by the isocyanate-reactive materials. The isocyanate index is typically at least 50, and may be up to 1000 or more. When flexible or semi-flexible cellular, microcellular or non-cellular polymers are prepared, the isocyanate index is generally from 70 to about 150 and more typically from about 70 to 125. Tighter ranges may be used in specific cases. Rigid polymers such as structural polyurethanes and rigid foams are typically made using an isocyanate index of from 90 to 200. Polymers containing isocyanurate groups are often made at isocyanate indices of at least 150, up to 600 or more.

The reaction of the polyisocyanate with the isocyanate-reactive materials may be performed all at once (a "one-shot" process), or can be conducted in stages through the formation of an isocyanate-terminated prepolymer or quasi-prepolymer which is then reacted with additional isocyanate-reactive material(s) to form the final polymer. The catalyst of the invention can be present during the formation of a prepolymer or quasi-prepolymer, during the reaction of the prepolymer or quasi-prepolymer to form a final polymer, or both stages.

The zinc catalyst is present in an amount sufficient to provide a commercially acceptable polymerization rate. A typical amount is from 0.001 to 5 parts by weight per 100 parts of isocyanate-reactive materials present in the polymerization process, although amounts may vary depending on the particular polymerization process and the particular reactants that are present. A preferred amount is from 0.05 to 2 parts by weight per 100 parts by weight of isocyanate-reactive materials.

A wide variety of polymers can be made in accordance with the invention, through the proper selection of particular polyisocyanates, isocyanate-reactive materials, the presence of optional materials such as are described below, and reaction conditions. The process of the invention can be used to produce polyurethane and/or polyurea polymers of various types, including cast elastomers, flexible or semi-flexible reaction injection molded parts (which may be reinforced and/or contain fillers), rigid structural composites which contain reinforcements and/or fillers, flexible polyurethane foams, which may be made in slabstock and/or molding processes, rigid polyurethane foams, sealants and adhesives (including moisture-curable types), binders such as for polymer concrete or for cushioning material such as playground surfaces, mats and the like, cushion and/or unitary backings for carpet and other textiles, semi-flexible foams, pipe insulation, automotive cavity sealing, automotive noise and/or vibration dampening, microcellular foams such as shoe soles, tire fillers, and the like. Processes for making polyurethane and/or polyureas of all of these types are well known; conventional processing methods for making these products are entirely suitable for use with this invention.

Depending on the particular type of polymer being produced and the needed attributes of the polymer, a wide variety of additional materials may be present during the reaction of the isocyanate compound with the isocyanate-reactive materials. Among these materials are surfactants; blowing agents; cell openers; fillers; pigments and/or colorants; desiccants, reinforcing agents; biocides; preservatives; antioxidants; flame retardants; and the like.

One or more surfactants may be present, especially when some blowing agent is incorporated into the formulation. A surfactant can help to stabilize the cells of the composition as gas evolves to form bubbles. A surfactant can also help to wet filler particles and in that way make it easier to incorporate them into the system. Examples of suitable surfactants include alkali metal and amine salts of fatty acids, such as sodium oleate, sodium stearate, diethanolamine oleate, diethanolamine stearate, diethanolamine ricinoleate and the like; alkali metal and amine salts of sulfonic acids such as dodecylbenzenesulfonic acid and dinaphthylmethanedisulfonic acid; ricinoleic acid; siloxane-oxyalkylene polymers or copolymers and other organopolysiloxanes; oxyethylated alkylphenols (such as Tergitol NP9 and Triton X100, from The Dow Chemical Company); oxyethylated fatty alcohols such as Tergitol 15-S-9, from The Dow Chemical Company; paraffin oils; castor oil; ricinoleic acid esters; turkey red oil; peanut oil; paraffins; fatty alcohols; dimethyl polysiloxanes and oligomeric acrylates with polyoxyalkylene and fluoroalkane side groups. These surfactants are generally used in amounts of 0.01 to 1 parts by weight based on 100 parts by weight of the polyols. Organosilicone surfactants are generally preferred types. Examples of commercially available surfactants that are useful include Dabco™ DC2585, Dabco™ DC5043 and Dabco™ DC5180 surfactants, available from Air Products, Niax™ U-2000 surfactant, available from GE OSi Silicones, and Tegostab™ B 8681, Tegostab™ B4351, Tegostab™ B8631, Tegostab™ B8707 and Tegostab B8715 surfactants, available from Th. Goldschmidt.

A blowing agent may be present if it is desired to form a cellular or microcellular polymer. Water, which is an isocyanate-reactive material, also functions as a blowing agent if present in sufficient quantities, because it reacts with isocyanate groups to liberate carbon dioxide, which then serves a blowing gas. However, other chemical and/or physical blowing agents can be used instead of or in addition to water. Chemical blowing agents react under the conditions of the elastomer-forming step to produce a gas, which is typically carbon dioxide or nitrogen. Physical blowing agents volatilize under the conditions of the polymer-forming step. Suitable physical blowing agents include various low-boiling chlorofluorocarbons, fluorocarbons, hydrocarbons and the like. Fluorocarbons and hydrocarbons having low or zero global warming and ozone-depletion potentials are preferred among the physical blowing agents.

In addition, a gas such as carbon dioxide, air, nitrogen or argon may be used as the blowing agent in a frothing process.

The amount of blowing agent can vary considerably, depending on the particular blowing agent used and the desired density of the resulting polymer.

Cell openers are often present in flexible foam formulations. Cell openers include high molecular weight (generally 6000-20,000 MW)polyethers, typically having ethylene oxide contents of at least 40%, preferably at least 50% by weight.

One or more fillers may also be present. A filler may help modify the composition's rheological properties in a beneficial way, reduce cost and impart beneficial physical properties to the foam. Suitable fillers include particulate inorganic and organic materials that are stable and do not melt at the temperatures encountered during the polyurethane-forming reaction. Examples of suitable fillers include kaolin, montmorillonite, calcium carbonate, wollastonite, talc, high-melting thermoplastics, glass, fly ash, carbon black, titanium dioxide, iron oxide, chromium oxide, azo/diazo dyes, phthalocyanines, dioxazines, colloidal silica and the like. The filler may impart thixotropic properties. Fumed silica is an example of such a filler. When used, fillers advantageously constitute from about 0.5 to about 30%, especially about 0.5 to about 10%, by weight of the polymer.

Some of the foregoing fillers may also impart color to the polymer. Examples of these include titanium dioxide, iron oxide, chromium oxide and carbon black. Other colorants such as azo/diazo dyes, phthalocyanines and dioxazines also can be used.

Reinforcing agents may also be present. The reinforcing agents take the form of particles and/or fibers that have an aspect ratio (ratio of longest dimension to shortest dimension) of at least 3, preferably at least 10. Examples of reinforcing agents include mica flakes, fiber glass, carbon fibers, boron or other ceramic fibers, metal fibers, flaked glass and the like. Reinforcing agents may be formed into mats or other preformed masses.

It is also possible to include one or more catalysts, in addition to the zinc catalyst described before. Suitable such additional catalysts include, for example:

i) a tertiary amine compound, such as trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, bis(2-dimethylaminoethyl) ether, morpholine, 4,4'-(oxydi-2,1-ethanediyl)bis, triethylenediamine, pentamethyl diethylene triamine, dimethyl cyclohexyl amine, N-cetyl N,N-dimethyl amine, N-coco-morpholine, N,N-dimethyl aminomethyl N-methyl ethanol amine, N,N,N'-trimethyl-N'-hydroxyethyl bis(aminoethyl) ether, N,N-bis(3-dimethylaminopropyl)N-isopropanolamine, (N,N-dimethyl)amino-ethoxy ethanol, N,N,N',N'-tetramethyl hexane diamine, 1,8-diazabicyclo-5,4,0-undecene-7, N,N-dimorpholinodiethyl ether, N-methyl imidazole, dimethyl aminopropyl dipropanolamine, bis (dimethylaminopropyl)amino-2-propanol, tetramethylamino bis(propylamine), (dimethyl(aminoethoxyethyl))((dimethyl amine)ethyl)ether, tris (dimethylamino propyl)amine, dicyclohexyl methyl amine, bis(N,N-dimethyl-3-aminopropyl)amine, 1,2-ethylene piperidine and methyl-hydroxyethyl piperazine;

ii) a tertiary phosphine such as a trialkylphosphine or dialkylbenzylphosphine;

ii) chelates of any of various metals, such as those which can be obtained from acetylacetone, benzoylacetone, trifluoroacetyl acetone, ethyl acetoacetate and the like, with metals such as Be, Mg, Zn, Cd, Pd, Ti, Zr, Al, Sn, As, Bi, Cr, Mo, Mn, Fe, Co and Ni;

iv) an acidic metal salt of a strong acid, such as ferric chloride, stannic chloride, stannous chloride, antimony trichloride, bismuth nitrate and bismuth chloride; strong bases, such as alkali and alkaline earth metal hydroxides, alkoxides and phenoxides;

(v) an alcoholate or phenolate of various metals, such as $Ti(OR)_4$, $Sn(OR)_4$ and $Al(OR)_3$, wherein R is alkyl or aryl, and the reaction products of the alcoholates with carboxylic acids, beta-diketones and 2-(N,N-dialkylamino)alcohols;

(vi) an alkaline earth metal, Bi, Pb, Sn or Al carboxylate salt; and (vii) a tetravalent tin compound, or a tri- or pentavalent bismuth, antimony or arsenic compound.

In preferred aspects, the zinc catalyst is used in combination with one or more organozirconium or organotitanium catalysts, or with a tertiary amine catalyst.

The processing method used to make the polymer is not considered to be critical to the invention, provided that the isocyanate compound and the isocyanate-reactive material(s) are mixed and, in the presence of the zinc catalyst, cured to form the polymer. The curing step is achieved by subjecting the reaction mixture to conditions sufficient to cause the isocyanate compound and isocyanate reactive material(s) to react to form the polymer.

Thus, for example, flexible and semi-flexible polyurethane foam can be made in accordance with the invention in a slabstock or molding process. Flexible polyurethane foams are typically made using one or more polyols having an equivalent weight per hydroxyl group of at least 500 to about 2200. Enough blowing agent is used to produce a foam having a density of from 1 to 8 pounds/cubic foot (16-128 kg/m$^3$), preferably from 1.5 to 4, pounds/cubic foot (24-64 kg/m$^3$). Water is a preferred blowing agent. Mixtures of water and a physical blowing agent can be used. A cross-linker and/or chain extender are often present, preferably a polyol or aminoalcohol crosslinker having a molecular weight per isocyanate reactive group of from about 30 to about 75. Isocyanate indices for making flexible polyurethane foam are typically from 70 to 125, more typically from 85 to 115.

Slabstock foam is conveniently prepared by mixing the foam ingredients and dispensing them into a trough or other region where the reaction mixture reacts, rises freely against the atmosphere (sometimes under a film or other flexible covering) and cures. In common commercial scale slabstock foam production, the foam ingredients (or various mixtures thereof) are pumped independently to a mixing head where they are mixed and dispensed onto a conveyor that is lined with paper or plastic. Foaming and curing occurs on the conveyor to form a foam bun. High resilience slabstock (HR slabstock) foam is made using methods similar to those used to make conventional slabstock foam. HR slabstock foams are characterized in exhibiting a Bashore rebound score of 55% or higher, per ASTM 3574.03.

Molded foam can be made according to the invention by transferring the reactants (polyol composition including hydroxymethyl-containing polyester polyol, polyisocyanate, blowing agent, and surfactant) to a closed mold where the foaming reaction takes place to produce a shaped foam. Either a so-called "cold-molding" process, in which the mold is not preheated significantly above ambient temperatures, or a "hot-molding" process, in which the mold is heated to drive the cure, can be used. Cold-molding processes are preferred to produce high resiliency molded foam.

Rigid polyurethane foam can be made in accordance with the invention. Rigid foam can be made in a pour-in-place process, as is often the case when the foam forms a thermal insulation layer in an appliance, cooler or other structure. Rigid foam also can be produced using pouring processes or sheet-forming processes. Flexible polyurethane foams are typically made using polyols and/or aminoalcohols having an average equivalent weight per hydroxyl group of at from about 40 to about 250, preferably from about 50 to about 125. Enough blowing agent is used to produce a foam having a density of from 1 to 8 pounds/cubic foot (16-128 kg/m$^3$), preferably from 1.5 to 4, pounds/cubic foot (24-64 kg/m$^3$). Water is a preferred blowing agent. Mixtures of water and a physical blowing agent can be used. Isocyanate indices for making flexible polyurethane foam are typically from 90 to 200. Indices of from 150 to 600 are often used when isocyanurate foams are to be produced.

Noncellular flexible and semi-flexible polyurethane and/or polyurea molded polymers can be made using various molding processes such as reaction injection molding, so-called SRIM or RRIM processes, various spray molding methods, and the like. In these systems, the isocyanate-reactive material is typically a mixture that includes one or more polyols and/or polyamines having a molecular weight per isocyanate-reactive group of at least 500, preferably at least 1200, to about 3000, preferably to about 2500, and at least one chain extender. Blowing agents are usually absent or used in very small amounts, so that the density of the resulting polymer is at least 500 kg/m$^3$. Isocyanate indices are typically from 90 to 125, preferably from 95 to 115.

The zinc catalyst is especially useful in processes in which a delayed cure is needed, due to processing constraints or for other reasons. Examples of these processes include certain sealant and adhesive applications, certain carpet backing or other textile-backing applications, and certain cast elastomer processes. Sealants and adhesives are often required to have an "open time" of from 2 to 60 minutes or more, to allow the sealant to be dispensed and the substrate(s) brought into position. Similarly, an open time is often required in carpet backing and other textile backing processes, because the reaction mixture must remain flowable long enough for it to be spread across the surface of the carpet or textile and gauged to a needed thickness. Cast elastomer processes often need a significant open time to allow for mold filling. In all of these processes, it is preferable to obtain a rapid cure after the necessary open time has passed.

Carpet and other textile cushion backings can be made in accordance with the invention via a mechanical frothing process. In such processes, air, nitrogen or other gas is whipped into the reaction. The frothed reaction mixture is then typically applied to a substrate where it is permitted to cure to form an adherent cellular layer. Such textile-backing processes are described, for example, in U.S. Pat. Nos. 6,372,810 and 5,908,701.

Cast elastomers are generally made using a prepolymer or quasi-prepolymer as the isocyanate-reactive compound. The prepolymer or quasi-prepolymer is prepared by reacting a polyisocyanate with at least one polyol that has a molecular weight of at least 400, preferably at least 800. The polyol(s) may have a molecular weight as high as about 12,000. A preferred molecular weight is up to 4000 and a more preferred molecular weight is up to 2000. The polyol(s) used in making the quasi-prepolymer preferably have an average of from 1.8 to 3.0, preferably from 1.8 to 2.5 and still more preferably about 1.9 to 2.2 hydroxyl groups per molecule.

A low (up to 300) molecular weight diol may be used to make the quasi-prepolymer, in addition to the foregoing ingredients. This low molecular weight diol preferably has a molecular weight of from 62 to 200. Examples of the low molecular weight diol include ethane diol, 1,2- or 1,3-propane diol, diethylene glycol, dipropylene glycol, triethylene glycol, tripropylene glycol, cyclohexanedimethanol, and the like. This material is usually used in small amounts, if at all. If used in making the quasi-prepolymer, from 1 up to 25 parts by weight thereof may be used per 100 parts by weight of the poly(propylene oxide) homopolymer.

The polyisocyanate used to make the prepolymer or quasi-prepolymer preferably contains an average of from 1.8 to 3.5, more preferably from 1.8 to 2.5 isocyanate groups per molecule and an isocyanate content of at least 25% by weight. Aliphatic polyisocyanates are preferred when light stability is needed. In other cases, TDI, MDI or an MDI derivative is often useful. MDI may be the 2,2'-, 2,4'- or 4,4'-isomer, with the 4,4'-isomer, or mixtures of the 4,4'- and 2,4'-isomer, being preferred. "Derivatives" of MDI are MDI that has been modified to include urethane, urea, biuret, carbodiimide, uretonimine or like linkages, and which has an isocyanate content of at least 25% by weight.

About two equivalents of the polyisocyanate are used per equivalent of the diol(s) to make a prepolymer. More than two equivalents of the polyisocyanate, typically at least 2.2 equivalents, are used per equivalent of the diol(s) used to make a quasi-prepolymer. The resulting product includes molecules formed by capping the diol(s) with the polyisocyanate and, in the case of quasi-prepolymer, some quantity of unreacted polyisocyanate. The prepolymer or quasi-prepolymer should have an isocyanate content of at least 4%, and preferably at least 8% by weight. The isocyanate content should not exceed 20% and preferably does not exceed 18% by weight. The prepolymer or quasi-prepolymer should contain an average of from about 1.9 to about 2.5, preferably from 1.9 to 2.3 and more preferably from 2.0 to 2.2 isocyanate groups per molecule.

A cast elastomer is formed by mixing the prepolymer or quasi-prepolymer with a chain extender and/or mixture of chain extender and at least one polyol having a hydroxyl equivalent weight of at least 250, preferably at least 500, and allowing the mixture to cure in the presence of the zinc catalyst in a mold. The mold may be open or closed A preferred polyol for this application is an ethylene oxide-terminated polypropylene oxide diol or triol, or a mixture thereof with at least one poly(propylene oxide) homopolymer diol or triol. The equivalent weights of the polyol(s) in this application may be up to 2000. The average functionality of the polyol(s) is preferably from about 2 to about 3, more preferably from about 2 to about 2.3.

The chain extender may constitute from 2 to 25%, preferably from 4 to 20%, of the combined weight of the combined weight of chain extender(s) and polyols having a hydroxyl equivalent weight of at least 250.

To prepare the elastomer, the starting materials are generally mixed in ratios that produce an isocyanate index of at least 70 to about 130. A preferred isocyanate index is from 80 to 120, and a more preferred index is from 90 to 110.

The curing conditions are not generally considered to be critical provided that the mixture cures adequately. The components or the mixture may be preheated before being introduced into the mold. The mold may be preheated. It is usually necessary to cure the mixture at elevated temperature; for that reason the filled mold is generally heated in an oven or other suitable apparatus. Mold temperatures may be from 40 to 90° C. Curing times can range from as little as one minute to 60 minutes or more. After curing at least to the extent that the resulting elastomer can be removed from the mold without permanent damage or permanent deformation, the part can be demolded. If necessary, the part can be post-cured at an elevated temperature to complete the cure.

The elastomer will of course take the shape of the internal cavity of the mold; therefore the mold is designed to produce a part having the desired external shape and dimensions. A wide range of elastomeric parts can be produced, including gaskets, bushings, wheels, belts, and the like. However, shoe soles are an application of particular interest. The shoe sole may be, for example, a midsole, an insole, and outsole, or an integrated sole that performs two or more of these functions.

The cast elastomer may be produced at a density of as low as about 500 kg/m$^3$ by frothing the reaction mixture before curing it, or by including a blowing agent in the formulation. Suitable frothing methods are described in U.S. Pat. Nos. 3,755,212; 3,849,156 and 3,821,130.

In cast elastomer processes, the zinc catalyst often provides a long open time followed by a rapid cure. The physical properties of the resulting elastomer are often comparable to those obtained using conventional mercury catalysts. In addition, the elastomers usually have a good surface appearance, notably little or none of the surface inhomogeneity problem described above.

The appearance of the elastomer can sometimes be improved by heating the mixture of polyol and chain extender prior to combining them with the polyisocyanate. Heating into the range of 40-70° C. is usually sufficient, but higher heating temperatures can be used. The temperature of the reaction mixture, after the polyol/chain extender mixture is combined with the polyisocyanate, should be at least 40° C.

The following examples are provided to illustrate the invention but are not intended to limit the scope thereof. All parts and percentages are by weight unless otherwise indicated.

EXAMPLE 1

To a round-bottomed flask equipped with a stir bar are added 20.0 g (227 mmol) of acetylacetone and 250 mL of anhydrous methanol under nitrogen. To this solution is added 22.7 g (227 mmol) of N,N-dimethylethylenediamine. After refluxing overnight, the solution is cooled to room temperature and the volatiles are removed in vacuo to yield 38 g of a ligand compound.

1 mL of a 1.0 M diethyl zinc solution is added dropwise at room temperature to a solution of 0.369 g of this ligand compound in heptane. The resulting mixture is stirred at room temperature for 30 minutes and the volatiles are then removed in vacuo. To 0.5 g of the residual solid is added 2.0 g of tetrahydrofurfuryl alcohol to yield a catalyst solution.

A polyurethane elastomer is prepared in the following manner. A masterbatch of 7774 parts of a 6000 molecular weight, ethylene oxide-capped poly(propylene oxide)triol, 1078 parts of 1,4-butane diol and 177 parts of a molecular sieve paste is blended in a mechanical mixer. A 66.7 part sample of this masterbatch is dispensed into a plastic cup suitable for use on a FlakTex Speedmixer. 0.40 parts of the zinc catalyst solution are added to the masterbatch, and the mixture is mixed on the Speedmixer for 30 seconds at 800 rpm followed by one minute at 2350 rpm. Then, 34.5 parts of a modified MDI having an isocyanate functionality of about 2.1 is mixed in for another 1 minute and 15 seconds at 2350 rpm. The reaction mixture is then poured into a steel plaque mold that is sprayed with an external mold release and preheated to 80° C. Tack-free and demold times are measured, with demold time being the amount of time necessary before the part can be demolded without damage. Following demold, the parts are postcured for 1 hour at 80° C. in a forced air oven and allowed to sit overnight at room temperature. Tensile properties and Shore A hardness are measured according to ASTM D7108.

Comparative Elastomer A is made and tested in the same manner, except that 0.44 parts of a mercury carboxylate catalyst (Thorcat 535 from Thor Chemical) is used instead of the zinc (II) catalyst, and the parts are held at four days at room temperature between postcuring and testing.

Results of the testing are indicated in Table 1.

TABLE 1

| Property | Ex. 1 | Comp. Sample A |
|---|---|---|
| Tack-free time, minutes | 4.0 | 4.0 |
| Demold time, minutes | 5.5 | 5.0 |
| Tensile strength, MPa | 11.8 | 12.5 |
| Elongation at break, % | 320 | 271 |

The results in Table 1 indicate that the zinc catalyst provides for a similarly delayed cure (at the relative amounts used) as the mercury catalyst and forms an elastomeric product having comparable physical properties.

EXAMPLE 2 AND 2A

To a round-bottomed flask equipped with a stir bar are added 10.0 g (97.9 mmol) of 3,5-di-tert-butyl-salicylaldehyde and 250 mL of anhydrous MeOH under nitrogen. To this solution is added 22.9 g (97.9 mmol) of N,N-dimethylethylenediamine. After refluxing overnight, the solution is cooled to room temperature and the volatiles are removed in vacuo to yield 29 g of a ligand.

0.4 g of this ligand is added dropwise to 0.5 g of $Zn[N(SiMe_3)_2]_2$ in 15 ml of anhydrous toluene over a period of one hour. The resulting mixture is stirred at room temperature under nitrogen for 4 hours and the volatiles are then removed in vacuo. To 0.4 g of the residual solid is added 1.0 g of tetrahydrofurfuryl alcohol to yield a catalyst solution (Example 2).

The activity of this catalyst is evaluated according to the following general screening procedure: A mixture of 840 g of a 6000 molecular weight, ethylene oxide-capped poly (propylene oxide)triol, 117 g of 1,4-butanediol and 19.5 g of sieve paste) are blended to make a polyol masterbatch. 7.0 g of the polyol masterbatch are combined with 30 mg of the catalyst solution in a 20 mL vial. This mixture is stirred with a spatula by hand for one minute. To this is added 3.5 g of an MDI derivative having an isocyanate equivalent weight of about 130 and an isocyanate functionality of about 2.1. This mixture is stirred with a spatula by hand for one minute. After mixing, the vial is placed in an insulating foam block. The tack free time is determined as the time when a spatula touched to the surface of the curing reaction mixture comes away clean.

Using the general screening procedure described above, using 37.1 mg of the catalyst from Example 2, a tack free time of 4 minutes and 11 seconds is obtained. When the catalyst is evaluated again, this time using only 18.4 mg of the catalyst, the tack free time is 7 minutes and 19 seconds.

For Example 2A, the general screening procedure is repeated, using as the catalyst 10.2 mg of a 1:1 by weight mixture of the Example 3 catalyst and a titanium catalyst marketed commercially as Snapcure 2210. Tack-free time is 5 minutes. When the amount of the catalyst mixture is decreased to 6.2 mg, the tack-free time is about 7 minutes.

EXAMPLES 3 AND 3A

To a 40 mL vial are added 3.0 g (29 mmol) of N,N,N'-trimethylethylenediamine and 1.2 g (39 mmol) of paraformaldehyde in 15 mL of anhydrous MeOH under nitrogen. 4.8 g (29 mmol) of 2-tert-butyl-4-methylphenol are added. After stirring at 60° C. overnight, the solution is cooled to room temperature and the volatiles are removed in vacuo to yield 8 g of a ligand.

0.38 g of this ligand is added dropwise to a solution 0.5 g of $Zn[N(SiMe_3)_2]_2$ in 13 mL of anhydrous toluene. The resulting mixture is stirred for four hours at room temperature, and then the volatiles are removed in vacuo. To 0.4 g of the residual solid is added 1.0 g of tetrahydrofurfuryl alcohol to yield a catalyst solution (Example 3).

Catalyst Example 3 is evaluated according to the general screening procedure described in Example 2, using 29 mg of the catalyst; a tack free time of about 4 minutes is obtained. When the catalyst is evaluated again, this time using only 14.5 mg of the catalyst, the tack free time is about 7 minutes.

A polyurethane elastomer is made according to the procedure described in Example 1, using 0.3 g of the Example 3 catalyst. Tack-free time is 4 minutes, and demold time is 5.6 minutes. Tensile strength is 10.3 MPa and elongation is 275%.

For Example 3A, the general screening procedure of Example 2 is repeated, using as the catalyst 9.7 mg of a 1:1 by weight mixture of the Example 3 catalyst and a titanium catalyst marketed commercially as Snapcure 2210. Tack-free time is 5 minutes and 30 seconds. When the amount of the catalyst mixture is decreased to 5.8 mg, the tack-free time is about 6 minutes.

EXAMPLES 4 AND 5

To 0.53 g of the ligand described in Example 3 is added 2 mL of a 1.0 M diethylzinc solution in heptane. To this mixture is added a 10 mL of a tetrahydrofuran/pentane mixture. After one hour, 0.2 g of benzyl alcohol in 2 mL of pentane is added. After stirring this mixture at room temperature for four hours, the mother liquor is decanted from the solid white precipitate, and both phases are separately dried under reduced pressure. The solids obtained from the mother liquor are dissolved in 0.21 g of benzyl alcohol and 0.21 g of tetrahydrofurfuryl alcohol; this solution is designated catalyst Example 4. The precipitated solid are redissolved into 230 mg of tetrahydrofurfuryl alcohol to produce a catalyst solution which is designated Example 5.

A polyurethane elastomer is made according to the procedure described in Example 1, using 0.3 g of the Example 4 catalyst. Tack-free time is 4 minutes, and demold time is 5 minutes. Tensile strength is 10.7 MPa and elongation is 227%.

A polyurethane elastomer is made according to the procedure described in Example 1, using 0.4 g of the Example

EXAMPLE 6

1 g of 1-(3-aminopropyl)-imidazole is added to 0.8 g of acetylacetone in 2 mL anhydrous methanol. This mixture is stirred overnight at 60° C. The mixture is cooled to room temperature and the volatiles are removed under vacuum to yield a ligand.

7 mg of this ligand is added to 15 mg of $Zn[N(SiMe_3)_2]_2$ in 0.5 mL of $C_6D_6$. The resulting mixture is stirred for a period at room temperature to produce a catalyst solution.

This catalyst is evaluated according to the general screening procedure described in Example 2, using the entire catalyst solution. Tack free time is 5 minutes and 30 seconds.

EXAMPLE 7

15 mg of the ligand described in Example 6 is added dropwise to 15 mg of $Zn[N(SiMe_3)_2]_2$ in 0.5 mL of $C_6D_6$. The resulting mixture is stirred for a period at room temperature to produce a catalyst solution.

This catalyst is evaluated according to the general screening procedure described in Example 2, using the entire catalyst solution. Tack free time is 3 minutes and 44 seconds.

EXAMPLE 8

0.86 g of 2-aminomethyl pyridine is added to 0.8 g of acetylacetone in 2 mL anhydrous methanol. This mixture is stirred overnight at 60° C. The mixture is cooled to room temperature and the volatiles are removed under vacuum to yield a ligand.

7 mg of this ligand is added dropwise to 15 mg of $Zn[N(SiMe_3)_2]_2$ in 0.5 mL of $C_6D_6$. The resulting mixture is stirred for a period at room temperature to produce a catalyst solution.

This catalyst is evaluated according to the general screening procedure described in Example 2, using the entire catalyst solution. Tack free time is 6 minutes and 20 seconds.

EXAMPLE 9

15 mg of the ligand described in Example 8 is added to 15 mg of $Zn[N(SiMe_3)_2]_2$ in 0.5 mL of $C_6D_6$. The resulting mixture is stirred for a period at room temperature to produce a catalyst solution.

This catalyst is evaluated according to the general screening procedure described in Example 2, using the entire catalyst solution. Tack free time is 4 minutes and 18 seconds.

EXAMPLE 10

1.36 g of N,N-diethyldiethylenetriamine is added to 2.0 g of 3,5-di-tert-butyl-salicylaldehyde in 5 mL anhydrous methanol. This mixture is stirred overnight at 60° C. The mixture is cooled to room temperature and the volatiles are removed under vacuum to yield a ligand.

19 mg of this ligand is added to 20 mg of $Zn[N(SiMe_3)_2]_2$ in 0.5 mL of $C_6D_6$. The resulting mixture is stirred for a period at room temperature to produce a catalyst solution.

This catalyst is evaluated according to the general screening procedure described in Example 2, using the entire catalyst solution. Tack free time is 2 minutes and 7 seconds.

5 catalyst. Tack-free time is 3.6 minutes, and demold time is 4.6 minutes. Tensile strength is 10.0 MPa and elongation is 240%.

EXAMPLE 11

0.87 g of tetrahydrofurfurylamine is added to 2.0 g of 3,5-di-tert-butyl-salicylaldehyde in 5 mL anhydrous methanol. This mixture is stirred overnight at 60° C. The mixture is cooled to room temperature and the volatiles are removed under vacuum to yield a ligand.

16 mg of this ligand is added to 20 mg of $Zn[N(SiMe_3)_2]_2$ in 0.5 mL of $C_6D_6$. The resulting mixture is stirred for a period at room temperature to produce a catalyst solution.

This catalyst is evaluated according to the general screening procedure described in Example 2, using the entire catalyst solution. Tack free time is 4 minutes and 45 seconds.

EXAMPLE 12

1.5 g of 3,3-iminobis(N,N-dimethylpropylamine) is added to 0.3 g of paraformaldehyde in 5 mL anhydrous methanol. This mixture is stirred for two hours at 60° C. The mixture is cooled to room temperature and 1.31 g of 2-tert-butyl-4-methylphenol is added. The mixture is stirred overnight at 60° C., cooled to room temperature, and the volatiles are removed under vacuum to yield a ligand.

19 mg of this ligand is added to 20 mg of $Zn[N(SiMe_3)_2]_2$ in 0.5 mL of $C_6D_6$. The resulting mixture is stirred for a period at room temperature to produce a catalyst solution.

This catalyst is evaluated according to the general screening procedure described in Example 2, using the entire catalyst solution. Tack free time is 2 minutes and 4 seconds.

EXAMPLE 13

1.0 g of N,N-2,2-tetramethylpropanediamine is added to 1.8 g of 3,5-di-tert-butyl-salicylaldehyde in 15 mL anhydrous methanol. This mixture is stirred overnight at 60° C. The mixture is cooled to room temperature and the volatiles are removed under vacuum to yield a ligand.

18 mg of this ligand is added to 20 mg of $Zn[N(SiMe_3)_2]_2$ in 0.5 mL of $C_6D_6$. The resulting mixture is stirred for a period at room temperature to produce a catalyst solution.

This catalyst is evaluated according to the general screening procedure described in Example 2, using the entire catalyst solution. Tack free time is 25 seconds.

EXAMPLE 14

2.0 g of N,N-2,2-tetramethylpropane diamine is added to 1.54 g of acetylacetone in 15 mL anhydrous methanol. This mixture is stirred overnight at 60° C. The mixture is cooled to room temperature and the volatiles are removed under vacuum to yield a ligand.

11 mg of this ligand is added to 20 mg of $Zn[N(SiMe_3)_2]_2$ in 0.5 mL of $C_6D_6$. The resulting mixture is stirred for a period at room temperature to produce a catalyst solution.

This catalyst is evaluated according to the general screening procedure described in Example 2, using the entire catalyst solution. Tack free time is 40 seconds.

EXAMPLE 15

1.0 g of p-cresol is added to 2.2 g of N-methyl piperazine in 10 mL anhydrous 1,4-dioxane. To this solution is added to 0.7 g of paraformaldehyde, and the resulting mixture is stirred overnight at 60° C. The mixture is cooled to room temperature and the volatiles are removed under vacuum to yield a thick brown oil.

15 mg of this ligand is added to 20 mg of $Zn[N(SiMe_3)_2]_2$ in 0.5 mL of $C_6D_6$. The resulting mixture is stirred for a period at room temperature to produce a catalyst solution.

This catalyst is evaluated according to the general screening procedure described in Example 2, using the entire catalyst solution. Tack free time is 7 minutes and 30 seconds.

What is claimed is:

1. A process for preparing a polyisocyanate-based polymer, comprising forming a reaction mixture containing at least one polyisocyanate, at least one isocyanate-reactive compound having at least two isocyanate-reactive groups and at least one zinc catalyst, and then curing the reaction mixture to form a polymer, wherein the zinc catalyst contains at least one zinc atom associated with a polydentate organic ligand that contains at least two complexing sites, of which at least one is nitrogen-containing, wherein the ligand compound is
a β-imino alcohol or enol.

2. The process of claim 1 wherein the ligand compound has either of structures III or V

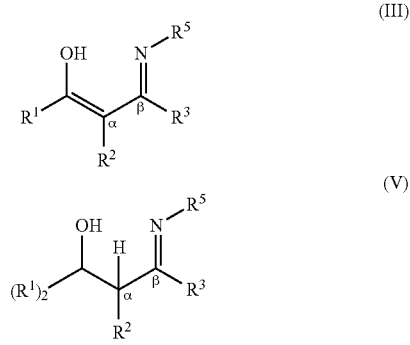

wherein $R^5$ is a group that is bonded to the indicated nitrogen atom through a carbon, oxygen, nitrogen or silicon atom and each $R^1$, $R^2$ and $R^3$ is independently hydrogen or a group that is bonded to the indicated carbon atom through a carbon, oxygen, nitrogen or silicon atom, provided that any two or more of $R^1$, $R^2$ and $R^3$ may together form a divalent or trivalent group that is bonded to the indicated carbon atoms through carbon, oxygen, nitrogen and/or silicon atoms, and further provided that an $R^3$ and an $R^5$ group may together form a divalent group that is bonded to the indicated carbon atom and the indicated nitrogen atom though carbon, oxygen, nitrogen and/or silicon atoms.

3. The process of claim 2, wherein each $R^5$ group is a hydrocarbyl group that is unsubstituted, inertly substituted, or substituted with one or more complexing sites, or a hydroxyl, an ether group, or a primary, secondary or tertiary amino group.

4. The process of claim 3 wherein each $R^1$, $R^2$ and $R^3$ is independently hydrogen or a hydrocarbyl group that is unsubstituted, inertly substituted, or substituted with one or more complexing sites.

5. The process of claim 1 wherein the polyisocyanate-based polymer is a polyurethane, polyurea, or polyurethane-urea.

6. The process of claim 1, wherein the reaction mixture further contains a blowing agent and a surfactant, and the polyisocyanate-based polymer is a foam.

7. The process of claim 1, wherein the isocyanate-reactive compound includes a polyol having a molecular weight of from 800 to 12,000 and an average of from 1.8 to 2.5 hydroxyl groups per molecule, and the polyisocyanate-based polymer is a cast elastomer.

8. The process of claim 1 wherein the reaction mixture contains at least one additional catalyst.

* * * * *